Patented Apr. 18, 1933

1,904,934

UNITED STATES PATENT OFFICE

ROBERT L. SIBLEY, OF NITRO, WEST VIRGINIA, ASSIGNOR TO THE RUBBER SERVICE LABORATORIES COMPANY, OF AKRON, OHIO, A CORPORATION OF OHIO

RETARDER FOR USE IN RUBBER VULCANIZATION PROCESS

No Drawing.      Application filed March 18, 1931. Serial No. 523,648.

This invention relates to the vulcanization of rubber by an improved process, wherein there is employed a member of a preferred class of compounds which improves the action of the accelerator used in the vulcanization process and permits the more ready handling of a rubber stock. More specifically, the preferred class of compounds act to retard the vulcanization in the earlier stages of the process, but do not exert such retarding action and may even accelerate the cure in the later stages of the vulcanization process. This retarding effect in the early cures is highly desirable, as scorching or vulcanizing on the mixing rolls is thereby materially decreased and in many cases substantially prevented. A substance which possesses the retarding properties described is known as a retarder. The preferred class of compounds employed in the manner hereinafter described comprises a substituted ammonia, wherein one or more of the hydrogens have been replaced by an organic acyl radical, or, more particularly, the preferred class of compounds comprise those organic materials known as amides and imides. By the term imide as appearing in the present specification is meant a compound possessing the structural formula of

or a possible tautomeric formula of

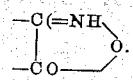

The retarding effects of a chemical compound in the process of vulcanizing rubber can be readily ascertained by incorporating a small portion of the compound or retarder in a rubber stock of vulcanization characteristics, preferably in the presence of an accelerator, heating portions of the rubber compound thus formed for various periods of time and under various pressures, and comparing the modulus of elasticity and tensile strength of the vulcanized product so formed with the modulus and tensile figures of another vulcanized rubber product prepared in the manner specified above but containing no retarder. Further data regarding the retarding effect of the materials set forth herein can be obtained by determining the plasticity of a rubber stock containing the materials and heated for varying periods of time at a temperature lower than that ordinarily employed in the vulcanizing process.

As example showing the use of the preferred class of compounds, six rubber stocks, designated by the letters A to F, were compounded in the well known manner. The compositions of these stocks are given in Table I, the figures indicating the number of proportional parts of each ingredient present.

Table I

|  | A | B | C | D | E | F |
|---|---|---|---|---|---|---|
| Pale crepe rubber | 100 | 100 | 100 | 100 | 100 | 100 |
| Zinc oxide | 5 | 5 | 5 | 5 | 5 | 5 |
| Sulfur | 3 | 3 | 3 | 3 | 3 | 3 |
| Acetaldehyde derivative of the reaction product of para-para-diamino-diphenyl-methane and mercaptobenzothiazole, prepared according to the method set forth in the co-pending U. S. patent application Serial No. 456,808 | 0.3 | 0.3 | 0.3 | 0.3 | 0.3 | 0.3 |
| Diphenylguanidine | 0.7 | 0.7 | 0.7 | 0.7 | 0.7 | 0.7 |
| Acetamide |  | 0.1 |  |  |  |  |
| Phthalimide |  |  | 0.2 |  |  |  |
| Acetanilide |  |  |  | 0.1 |  |  |
| Succinimide |  |  |  |  | 0.2 |  |
| Chlorphthalimide |  |  |  |  |  | 0.1 |

The results of the modulus and tensile tests upon the above described rubber stocks after curing for various periods of time and under various steam pressures are given in Table II.

Table II

| Cure mins. | Steam pressure lbs./in.² | Stock | Modulus of elasticity in lbs./in.² at elongations of— | | | Tensile lbs./in.² at break | Ultimate elongation % |
|---|---|---|---|---|---|---|---|
| | | | 300% | 500% | 700% | | |
| 15 | 10 | A | 132 | 238 | 690 | 2320 | 960 |
| 15 | 10 | B | 126 | 185 | 565 | 2050 | 1010 |
| 15 | 10 | C | 26 | 113 | 473 | 1820 | 960 |
| 15 | 10 | D | 85 | 170 | 485 | 1595 | 945 |
| 15 | 10 | E | 91 | 173 | 503 | 1910 | 965 |
| 15 | 10 | F | 80 | 144 | 323 | 1740 | 1070 |
| 20 | 10 | A | 87 | 202 | 778 | 2745 | 940 |
| 20 | 10 | B | 108 | 208 | 651 | 2375 | 950 |
| 20 | 10 | C | 71 | 187 | 685 | 2490 | 950 |
| 20 | 10 | D | 100 | 202 | 567 | 2280 | 980 |
| 20 | 10 | E | 66 | 164 | 608 | 2335 | 960 |
| 20 | 10 | F | 99 | 188 | 511 | 2520 | 1035 |
| 30 | 10 | A | 150 | 316 | 1163 | 3270 | 895 |
| 20 | 10 | B | 141 | 296 | 1040 | 2755 | 890 |
| 30 | 10 | C | 126 | 270 | 1050 | 2870 | 900 |
| 30 | 10 | D | 132 | 280 | 1005 | 2970 | 920 |
| 30 | 10 | E | 137 | 303 | 1000 | 2800 | 890 |
| 30 | 10 | F | 109 | 238 | 875 | 3055 | 930 |
| 60 | 20 | A | 262 | 926 | 3675 | 5030 | 765 |
| 60 | 20 | B | 294 | 910 | 3530 | 4235 | 750 |
| 60 | 20 | C | 289 | 955 | 3640 | 4970 | 770 |
| 60 | 20 | D | 290 | 938 | 3530 | 4860 | 775 |
| 60 | 20 | E | 214 | 710 | 3180 | 4560 | 775 |
| 60 | 20 | F | 262 | 755 | 3010 | 4960 | 800 |
| 90 | 20 | A | 316 | 1105 | 4330 | 4345 | 750 |
| 90 | 20 | B | 287 | 1055 | 4000 | 5125 | 750 |
| 90 | 20 | C | 314 | 1055 | 4015 | 4575 | 750 |
| 90 | 20 | D | 295 | 978 | 3910 | 5235 | 760 |
| 90 | 20 | E | 298 | 990 | 3640 | 4620 | 755 |
| 90 | 20 | F | 288 | 873 | 3545 | 5025 | 770 |

The above results show by comparison that the preferred class of compounds, for example, acetamide, phthalimide, acetanilide, succinimide and chlorphthalimide, exhibit marked retarding effects on the vulcanization process in the shorter timed cures when incorporated in a rubber stock of vulcanizing characteristics, while the retarding effect does not persist at full cure.

Further examples of the preferred class of compounds, for example, benzanilide and benzamide, have been tested as retarders in the manner hereinbefore described and found to possess the desired retarding properties.

Other examples of amides and imides than those hereinbefore set forth may be employed in the manner described. Thus, formanilide, formamide, diacetamide, acetochloramide, diphenyl-benzamide, maleinimide and analogous compounds may be employed as retarders in the vulcanization process.

This invention is not restricted to the use of the particular compounds given in the disclosure as examples, nor is it restricted to the use of the preferred class of compounds in the particular rubber mixes herein disclosed, since other rubber mixes are apparent to those skilled in the art. The invention is limited only by the claims attached hereto as part of the present specification.

What is claimed is:

1. The process of vulcanizing rubber which comprises heating a mixture of rubber and sulfur in the presence of a substituted ammonia, wherein one or more hydrogen atoms of said ammonia have been replaced by an acyl radical only containing more than one carbon atom.

2. The process of vulcanizing rubber which comprises heating a mixture of rubber and sulfur in the presence of a substituted ammonia, wherein one or more hydrogen atoms of said ammonia have been replaced by an aromatic acyl radical only.

3. The process of vulcanizing rubber which comprises heating a mixture of rubber and sulfur in the presence of a substituted ammonia, wherein two hydrogen atoms of said ammonia have been replaced by an acyl radical.

4. The process of vulcanizing rubber which comprises heating rubber and sulfur in the presence of an imide.

5. The process of vulcanizing rubber which comprises heating rubber and sulfur in the presence of an aromatic imide.

6. The process of vulcanizing rubber which comprises heating rubber and sulfur in the presence of phthalimide.

7. The vulcanized rubber product prepared by heating rubber and sulfur in the presence of a substituted ammonia, wherein one or more hydrogen atoms of said ammonia have been replaced by an acyl radical only containing more than one carbon atom.

8. The vulcanized rubber product prepared by heating rubber and sulfur in the presence of a substituted ammonia, wherein one or more hydrogen atoms of said ammonia have been replaced by an aromatic acyl radical only.

9. The vulcanized rubber product prepared by heating rubber and sulfur in the presence of a substituted ammonia, wherein two hydrogen atoms of said ammonia have been replaced by an acyl radical.

10. The vulcanized rubber product prepared by heating rubber and sulfur in the presence of an imide.

11. The vulcanized rubber product prepared by heating rubber and sulfur in the presence of an aromatic imide.

12. The vulcanized rubber product prepared by heating rubber and sulfur in the presence of phthalimide.

In testimony whereof I hereunto affix my signature.

ROBERT L. SIBLEY.